United States Patent [19]
Reul et al.

[11] Patent Number: 5,540,961
[45] Date of Patent: Jul. 30, 1996

[54] PROCESS FOR THE PRODUCTION OF A LAMINATED GLASS GLAZING HAVING METAL WIRES IN AN INTERMEDIATE THERMOPLASTIC LAYER

[75] Inventors: M. Bernard Reul; Stefan Immerschitt, both of Allemagne, Germany

[73] Assignee: Saint-Gobain Vitrage, Courbevoie, France

[21] Appl. No.: 353,398

[22] Filed: Dec. 2, 1994

[30] Foreign Application Priority Data

Dec. 2, 1993 [DE] Germany .................. 43 41 017.0

[51] Int. Cl.⁶ ................................................ B32B 9/00
[52] U.S. Cl. .................. 428/34; 428/35.7; 428/35.8; 428/38; 428/46; 428/48; 428/192; 428/425.6; 428/426; 428/432; 428/437; 428/457; 296/96.21
[58] Field of Search .................. 428/426, 437, 428/432, 697, 913, 34.1, 34, 35.7, 35.8, 425.6, 457, 192, 38, 46, 48; 296/96.21

[56] References Cited

U.S. PATENT DOCUMENTS

| | | | |
|---|---|---|---|
| 3,888,711 | 6/1975 | Breitner | 156/93 |
| 3,900,634 | 8/1975 | Plumat et al. | 428/208 |
| 3,924,359 | 6/1976 | Orcutt et al. | 219/522 |
| 4,284,452 | 8/1981 | Bethge et al. | 156/99 |
| 4,321,296 | 3/1982 | Rougier | 428/212 |
| 5,099,105 | 3/1992 | Goerenz et al. | 219/203 |
| 5,128,513 | 7/1992 | Byars et al. | 219/203 |
| 5,132,162 | 6/1992 | De Paoli | 428/192 |

FOREIGN PATENT DOCUMENTS 1392736  6/1972  United Kingdom .

Primary Examiner—Patrick J. Ryan
Assistant Examiner—Abraham Bahta
Attorney, Agent, or Firm—Oblon, Spivak, McClelland, Maier & Neustadt, P.C.

[57] ABSTRACT

A process for the production of a laminated glass glazing having one or more wires within an intermediate thermoplastic layer and electrically connected to busbars, wherein the wires are heated by an adequate energy application locally limited to the connection points prior to the electrical connection to the busbars, to the extent that the surface layers adhering to the surface of the wires are eliminated. The application of a locally limited adequate energy supply takes place by use of laser rays, as a result of the fact that the focus of a beam of laser rays oriented perpendicular to the busbars is displaced in the longitudinal direction above and on the busbars. The wires are then welded to the busbars. The layers forming the laminated glass glazings are presently assembled in a conventional manner and joined to one another under heat and pressure.

10 Claims, 1 Drawing Sheet

PROCESS FOR THE PRODUCTION OF A LAMINATED GLASS GLAZING HAVING METAL WIRES IN AN INTERMEDIATE THERMOPLASTIC LAYER

BACKGROUND OF THE INVENTION

1. Field of the Invention

The present invention relates to a process for the production of a laminated glass glazing constituted by several layers and having one or more wires within an intermediate thermoplastic layer and in which, prior to assembly of the layers, an electrically conductive connection is established between the wires and one or more metal elements and then the layers are joined to one another by heat and pressure.

2. Discussion of the Background

Laminated glass glazings having wires inserted in the intermediate thermoplastic layer and connected to metal elements are used, e.g. in cars, as electrically heatable glass glazings and/or as antenna windscreens. Other applications of such glazings more particularly relate to the building sector, where they can also be used as electrically heatable glazings, but also, for example, as alarm glazings for the protection of rooms against burglary and escape or as electrical protection glazings. Within the laminated glass glazing the wires are generally contacted with one or more metal elements e.g. leading to an externally accessible, electrical connection element.

When the wires in the intermediate thermoplastic layer are used as heating wires, in general several such heating wires are connected in parallel, being connected to collecting Lines arranged along two opposite edges of the glazing. The wires located in the laminated glass glazing are generally very thin, and, for example, have a diameter of 0.005 to 0.1 mm in order to bring about minimum deterioration to the transparency of the glazing. Such heating glazings are, for example, known from U.S. Pat. No. 3,895,433, DE-OS 2,127,693 and DE-OS 3,001,554.

When the wires have a metal surface, they can be visible as a result of light reflections, even in the case of small diameters. These light reflections can be particularly prejudicial when the observer and the light source are on the same side of the glazing.

In order to prevent such disturbing interference, it is known to use metal wires, which are surface-darkened. However, such surface-darkened metal wires are difficult to weld or connect in some other way to electrically conductive elements and, in addition, as the surface layers absorb light, there is a frequently encountered an undesirable increase in the contact resistance between the wires; and the metal elements.

SUMMARY OF THE INVENTION

The object of the present invention is to provide a process for the production of a laminated glass glazing of the specified type which, even when use is made of wires having a light-absorbing surface layer, guarantees a good electrical connection between the wires and the metal elements (or collecting strips).

According to the invention this aim is achieved by the fact that the wires, prior to the electrical connection to the metal elements, are heated at the connection points by an adequate energy application locally limited to said point and in this way the surface layers adhering to the surfaces of the wires and bringing about an increased contact resistance are eliminated.

Thus, according to the process of the invention, for the production of laminated glass glazings, use is also made of slightly reflecting wires, but when such wires are used, there is a local elimination at the points provided for the electrical connection of the surface layer by means of adequate heating. Over the remainder of their length, the wires retain their surface layer and therefore their high light absorption capacity.

The treatment according to the invention ensures that the upper material layers are eliminated by adequate heating at the connection points. Although the procedure of the process according to the invention cannot entirely be explained, it can be assumed that the material of the upper layers, e.g. graphite and/or metal oxide is detached from the surface of the wire and/or is burned by thermal shock or is eliminated or neutralized by vaporization, by pyrolysis or by reduction to metal.

According to the type of metal used for the wires, the latter can be heated by the process according to the invention, at the connection points, to a temperature below the melting point of the metal of the wire, but above the volatilization point of the corresponding metal oxide. Thus, for example, in the case of the tungsten used as the wire metal, the melting point is approximately 3400° C., whereas the volatilization temperature of tungsten trioxide is approximately 1750° C.

For example, the application of energy can take place prior to the placing of the wires on the thermoplastic layer. Thus, the wires are already prepared for the electrical connection before being put into place.

In this case, it is e.g. possible to combine the wire laying process with the surface treatment, because during the laying operation the wire segments, which are provided at the connection points to the metal element, for example, a busbar, are subject to the action of the energy immediately prior to the laying of said wire segments on the collecting conductor.

According to a particularly advantageous embodiment of the process according to the invention, prior to the assembly of the layers forming the laminated glass glazing, first the metal elements and then the wires are deposited above the metal elements on the intermediate thermoplastic layer and fixed. Energy application only takes place following the placing of the wires on the thermoplastic layer above the metal elements.

Although very high temperatures are usually necessary for the elimination of the surface layers, the application of energy can be provided for wires which are already in place and fixed to the thermoplastic material sheet, without any deterioration of the thermoplastic layer. As a result of the application of locally limited, adequate energy, it is possible on the one hand to each temperatures which are sufficiently high for the elimination of the surface layer of the wires and on the other hand to avoid heating prejudicial to their environment, by using a very high energy density, which is locally limited and of relatively short duration. This best takes place by applying brief energy pulses of a high power density at the locations to be treated. In this manner, the desired heating is substantially limited to the actual wires.

According to a particularly advantageous embodiment of the process according to the invention, the application of energy at the connection points takes place by means of a laser ray, the laser treatment being performable, if appropriate, under a reducing gas atmosphere.

According to another embodiment, energy application takes place by means of a gas microflame for which the combustible gas used is, for example, hydrogen. Electronic regulation makes it possible to control the action time of the flame at the connection point and therefore the temperature. When using gas flames having lengths of approximately 1 mm or even less, only a very small heat quantity is transmitted in a concentrated form to the connection points. It is therefore possible to only heat the actual connection points, without bringing about any deterioration to the areas around them.

BRIEF DESCRIPTION OF THE DRAWINGS

Other advantageous aspects and developments of the invention can be gathered from the dependent claims and the following description of an embodiment with reference to the attached drawings, wherein show:

DESCRIPTION OF THE PREFERRED EMBODIMENTS

Figure 1:
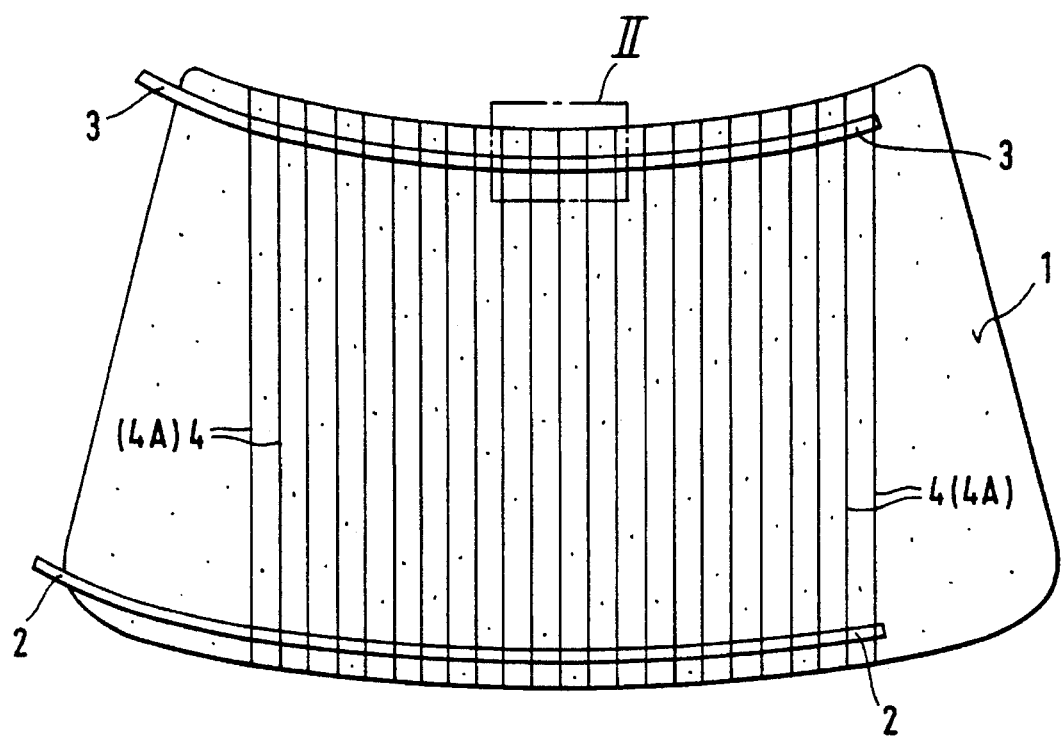
FIG. 1 an elevational view of a film provided for a heated glazing and provided with wires and busbars.

The thermoplastic film 1 shown in FIG. 1 must be subsequently incorporated into an electrically heatable windscreen. It is cut to its final dimensions and normally made from polyvinyl butyral. On said thermoplastic film 1, two galvanized copper foil ribbons 2,3 forming busbars for the wires 4 serving as heating conductors are first placed parallel to the longitudinal edges of the film and at a short distance therefrom and are fixed by heating to the thermoplastic film. The wires 4 are then deposited on the thermoplastic film 1. At the locations provided for the electrical connection, the wires 4 are placed on the busbars 2,3. The wires 4 are preferably darkened tungsten wires with a diameter of 20 to 50 μm.

Figure 2:
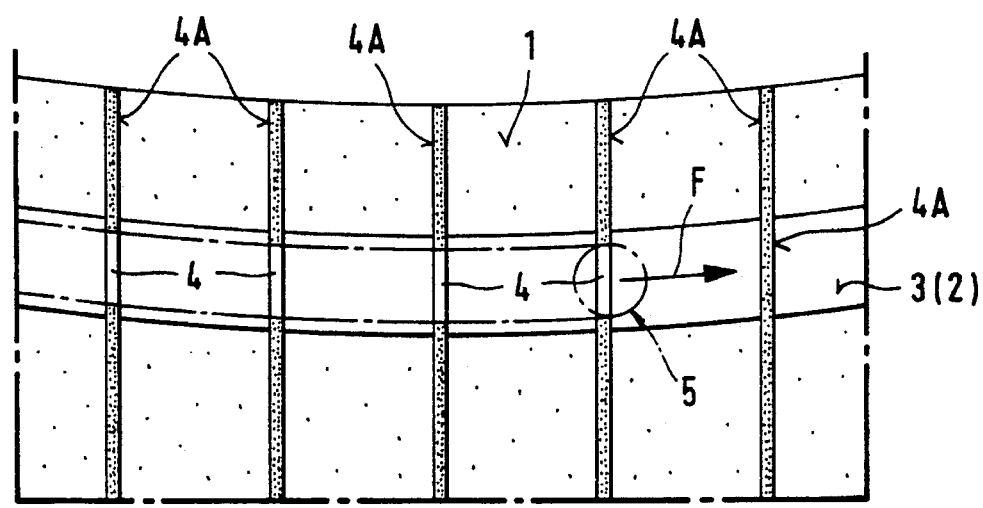
FIG. 2 illustrates on a larger scale, a fragmentary view of FIG. 1 during the application of energy to the connection points.

The surface treatment of the wires 4 according to the invention takes place, as shown in FIG. 2, at the locations where they are placed on the busbars 2,3. In this case, the application of energy to the connection points takes place by means of a laser ray, as a result of the fact that the focus 5 of a beam of laser rays directed perpendicular to the busbars 2,3 is displaced in the direction of the arrow F on said busbars. The energy level applied can in this case be regulated within wide limits by regulating the power of the radiation, a modification to the duration of the pulses and the frequency of the pulses in the case of pulsed lasers, as well as by a variation to the displacement speed of the laser ray acting on the wire, the optimum conditions being determined beforehand by testing.

Different lasers can be used for the purposes of the present invention. The use of a laser having an emission wavelength below 2.5 μm has the advantage that the laser light can be guided towards the desired locations by a fiberglass cable. In this case, the fiberglass cable provided at its end with adequate focussing optics is displaced by said optics on the wires, whereas the laser can remain stationary. Obviously an appropriate mechanical device can also be used for this purpose, e.g. a machine having a crosswise oriented carriage having a numerically controlled carriage guiding the laser optics at a given distance corresponding to the previously defined path on the wire segments located above the busbars 2,3.

For the treatment at the connection points, use is, for example, made of a pulsed ND:YAG laser with an emission wavelength lambda ~1.6 μm and the following process parameters: pulse energy 2 J, pulse duration 1 ms, pulse frequency 100 Hz and displacement speed 3 m/min. Obviously the displacement speed can be increased in the case of a higher laser power.

After in this way removing from the surface of the tungsten wires above the busbars 2,3 in a local manner the surface layer 4A adhering thereto, such as, for example, graphite, tungsten oxides and other impurities, a second copper ribbon galvanized on one side is placed on each of the busbars 2 and 3 with its galvanized side directed downwards. With the aid of a welding iron, which is then guided on said copper foil ribbon, the tin layers are melted and joined to the cleaned tungsten wire segments.

Instead of what has been stated hereinbefore, it is possible to operate in such a way that the action on the wires by means of the laser beach is carried out jointly with the surface cleaning of the wires, the tin being melted and the welded junction between the wires and busbars thus being directly established.

The thus prepared thermoplastic film 1 is at present placed between two glass sheets and is joined thereto in order to form a laminated glass glazing by an adequate treatment under pressure and heat in an autoclave following occluded air elimination.

The invention also relates to a heated laminated glazing incorporating an intercalated thermoplastic material layer (e.g. of polyvinyl butyryl) carrying at least one heating network of thin electrickel resistance, metal wires extending between two collecting strips, the resistance wires being provided with a light-absorbing surface layer in the field of vision of the glazing and being without said surface layer in the connection areas to the collecting strips.

The glazing can be obtained by performing the process described hereinbefore.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. Process for the production of a laminated glass glazing having a plurality of layers, comprising:

assembling one or more wires located within an intermediate thermoplastic layer and according to which, prior to assembly of the layers, an electrically conductive connection is established between the wires and one or more metal elements;

joining the layers to one another by a supply of heat and pressure, heating the wires at the connection points, prior to the electrical connection to the metal elements, by an energy application locally limited to each of said points, such that the existence of surface layers adhering to the surfaces of the wires and bringing about an increased contact resistance are eliminated.

2. Process according to claim 1, wherein prior to the assembly of the layers forming the laminated glass glazing, First the metal elements and then the wires are deposited above the metal elements on the intermediate thermoplastic layer and fixed and energy application only takes place after the placing of the wires on the thermoplastic layer above the metal elements.

3. Process according to claim 1, which comprises applying the energy to the connection points by a laser ray.

4. Process according to claim 3, which comprises using a laser ray having an emission wavelength below 2.5 μm.

5. Process according to claim 1, which comprises applying local energy to the connection points by a gas microflame.

6. Process according to any one of the claims 1 to 5, which comprises exposing the connection points for the wires during energy application to a reducing gas atmosphere.

7. Process according to any claim 2, wherein the metal elements comprise metal elements coated with weld metal and energy application takes place in such a way that, jointly with the elimination of the surface layers, the electrical contact between the wires and the metal elements is established by the melted weld metal.

8. Process according to any one of the claim 1, which comprises establishing the electrically conductive connection between the wires and the metal elements by an electrically conductive adhesive.

9. A method of using the process according to claim 1 for producing an electrically heatable, laminated glass glazing having tungsten heating wires in a parallel arrangement in the intermediate thermoplastic layer and electrically connected to busbars.

10. A heated laminated glazing incorporating an intercalated thermoplastic material layer having at least one heating network of fine, electrical resistance, metal wires extending between two collecting strips, the resistance wires being provided with a light-absorbing surface layer in a field of vision of the glazing, wherein said wires do not have said surface layer in areas of connection with the collecting strips.

\* \* \* \* \*